United States Patent [19]

Mukainakano et al.

[11] 4,434,753
[45] Mar. 6, 1984

[54] IGNITION APPARATUS FOR INTERNAL COMBUSTION ENGINE

[75] Inventors: Shinichi Mukainakano; Tadashi Hattori; Minoru Nishida, all of Okazaki; Toru Mizuno, Aichi; Tukasa Goto, Kariya, all of Japan

[73] Assignees: Nippon Soken, Inc., Nishio; Nippondenso Co., Ltd., Kariya, both of Japan

[21] Appl. No.: 378,717

[22] Filed: May 17, 1982

[30] Foreign Application Priority Data

May 18, 1981 [JP] Japan .................................. 56-75325
Oct. 29, 1981 [JP] Japan ................................. 56-173934

[51] Int. Cl.³ .................... F02B 45/08; F02B 23/00; F02P 23/04; F02P 1/00
[52] U.S. Cl. ..................... 123/143 B; 123/143 R; 123/23
[58] Field of Search ................ 123/143 B, 143 R, 23, 123/24 R, 553, 557, 558

[56] References Cited

U.S. PATENT DOCUMENTS

| | | | |
|---|---|---|---|
| 3,861,371 | 1/1975 | Gamell | 123/143 B |
| 4,041,922 | 8/1977 | Abe et al. | 123/143 B |
| 4,240,379 | 12/1980 | Armbruster | 123/23 |
| 4,314,530 | 2/1982 | Giachetti | 123/143 R |

*Primary Examiner*—Raymond A. Nelli
*Attorney, Agent, or Firm*—Cushman, Darby & Cushman

[57] ABSTRACT

An ignition apparatus for an internal combustion engine comprises an intake path supplying a mixture of air and fuel into the combustion chamber of the engine, a particle supplying unit having an ejection port opening into the combustion chamber for supplying minute particles of a material which is not the fuel and has a high light absorption factor, and a light source radiating a laser beam through a light focusing unit toward a suitably selected position in the internal space of the combustion chamber, so that the laser beam can strike the minute particles of high light absorption factor supplied from the particle supplying unit thereby producing a torch for igniting the air-fuel mixture.

13 Claims, 11 Drawing Figures

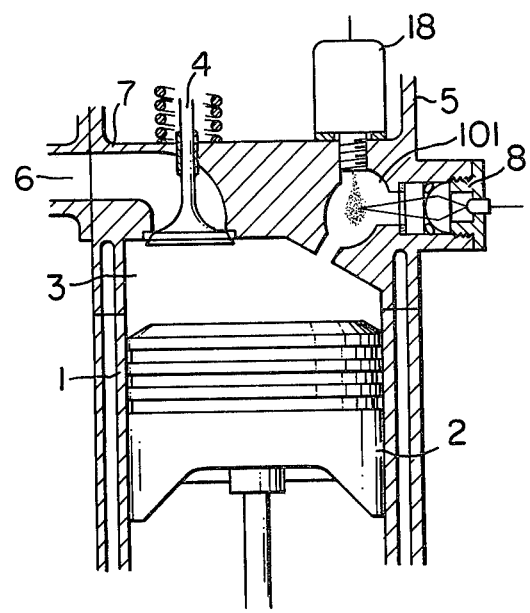
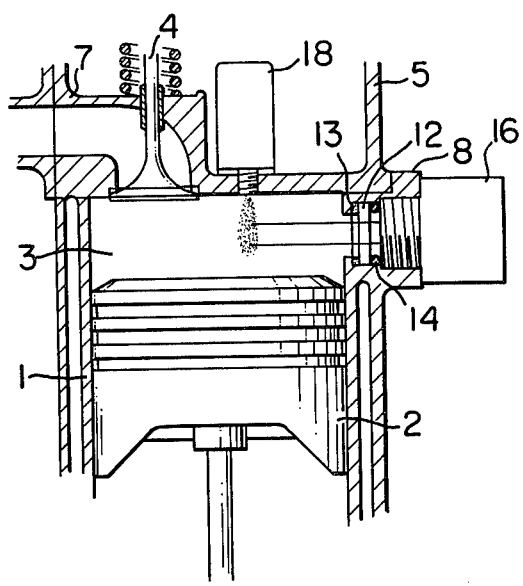
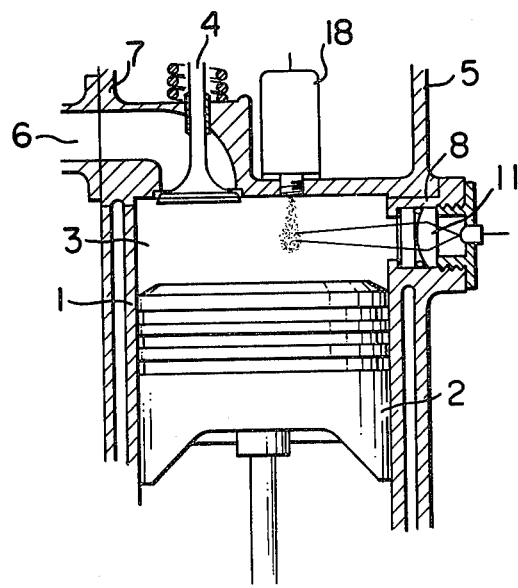
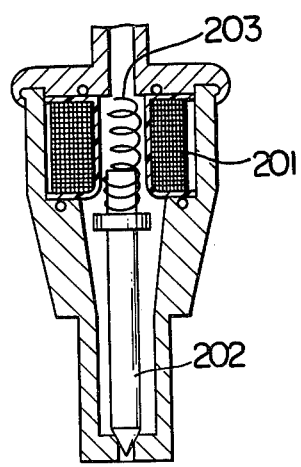

IGNITION APPARATUS FOR INTERNAL COMBUSTION ENGINE

BACKGROUND OF THE INVENTION

1. Field of the Invention

This invention relates to an ignition apparatus for an internal combustion engine, and more particularly to an ignition apparatus making ignition using a beam of light.

2. Description of the Prior Art

An ignition apparatus generally used for an internal combustion engine is of the type in which a spark plug is disposed on the wall of the combustion chamber of the engine to generate spark discharge in response to the application of a high voltage thereby igniting the air-fuel mixture supplied into the combustion chamber.

The ignition apparatus of this kind has been defective in that accumulation of carbon on the surface of the insulator of the spark plug, wear of the spark plug electrodes due to repeated spark discharge, etc. result in a gradual decrease of the energy of spark discharge or in a difficulty of spark discharge until finally ignition of the air-fuel mixture becomes impossible.

In the selection of the spark discharge position of the spark plug in the ignition apparatus of the type described, the spark plug is generally disposed to discharge a spark at a most easily ignitable position taking into account the influence of various factors including the air-fuel ratio and the flow of the air-fuel mixture in the combustion chamber. Thus, for example, the spark plug is disposed to protrude to the center of the combustion chamber. Such a spark plug position has however been proved undesirable from the aspect of, for example, the durability of the spark plug.

To solve the above problem, an ignition apparatus has been proposed in which a light beam of high energy density such as a laser beam is used to ignite the air-fuel mixture. The proposed ignition apparatus has based on the method of directly radiating the energy of light to the air-fuel mixture. According to this method, however, it is difficult to ignite the air-fuel mixture, within a short time corresponding to the rotation period of the engine, by the temperature rise of the gas resulting from the absorption of the energy of light, since the light absorption factor of the gas is low. The ignition by the proposed ignition apparatus is generally resorted to the phenomenon of dielectric breakdown of the gas (by turning the gas into the state of plasma) in the field of energy of light of high energy density which is about several ten megawatts. For this purpose, a light source for generating a very high output, such as, a giant pulse laser is essentially required. The proposed ignition apparatus has therefore been defective in that the cost thereof is very high and it is not practical, since such a light source consumes a large amount of power and operates with low efficiency, and the scale of the apparatus becomes inevitably large.

SUMMARY OF THE INVENTION

With a view to obviate the defects of the prior art apparatus, it is a primary object of the present invention to provide an ignitoin apparatus in which minute particles having a high light energy absorption factor are used to absorb the energy of light, so that a light beam of relatively low energy density can accelerate the temperature rise of the minute particles within a short period, and the air-fuel mixture can be efficiently ignited by the thermal energy of the heated minute particles.

The present invention which eliminates the use of the spark plug generating sparks in response to the application of a high voltage can obviate such a prior art defect that accumulation of carbon on the surface of the insulator of the spark plug, wear of the spark plug electrodes due to repeated spark discharge, etc. result in a gradual decrease of the energy of spark discharge or in a difficulty or spark discharge until finally the ignition of the air-fuel mixture becomes impossible. Further, according to the present invention, the most easily ignitable position can be selected as desired taking into account the influence of various factors including the air-fuel ratio and the flow of the air-fuel mixture in the combustion chamber.

Furthermore, according to the present invention, ignition of the air-fuel mixture can be efficiently achieved within a short period by the use of minute particles having a high light absorption factor which fully absorbs the energy of light. Therefore, there is utterly no need for causing the dielectric breakdown of the gas in the field of energy of light having a high energy density which is about several ten megawatts, and it is merely necessary to employ a light source generating a relatively low output, hence, consuming a small amount of power and operating with high efficiency. Therefore, the scale of the apparatus of the present invention is small and its cost is low.

In an embodiment of the ignition apparatus according to the present invention, the light beam is focused to at least more than one point in the internal space of the combustion chamber, and the minute particles are supplied toward these plural focused points, so that torches can be formed at the individual points in spite of a low energy density, and combustion can spread from such plural spots. Therefore, the combustion can be accelerated, and the combustion characteristic can be greatly improved.

In another embodiment of the ignition apparatus according to the present invention which is applied to an internal combustion engine such as a diesel engine in which atomized liquid fuel is directly injected into the combustion chamber, at least two or more focused points of the beam of light are formed in the stream of fuel being injected into the combustion chamber. Therefore, efficient ignition and acceleration of combustion can be achieved in, for example, the starting stage of the engine.

BRIEF DESCRIPTION OF THE DRAWINGS

FIG. 3 is a sectional view showing the structure of part of a second embodiment of the present invention.

FIG. 4 is a sectional view showing the structure of part of a third embodiment of the present invention.

FIG. 5 is a sectional view showing the structure of part of a fourth embodiment of the present invention.

FIG. 6 is a sectional view showing in detail the structure of a particle supplying unit employed in a fifth embodiment of the present invention.

FIGS. 8A and 8B show a seventh embodiment of the present invention, in which FIG. 8A is a vertical sectional view of part of the combustion chamber, and FIG. 8B is a cross sectional view of FIG. 8A.

DESCRIPTION OF THE PREFERRED EMBODIMENTS

Figure 1:
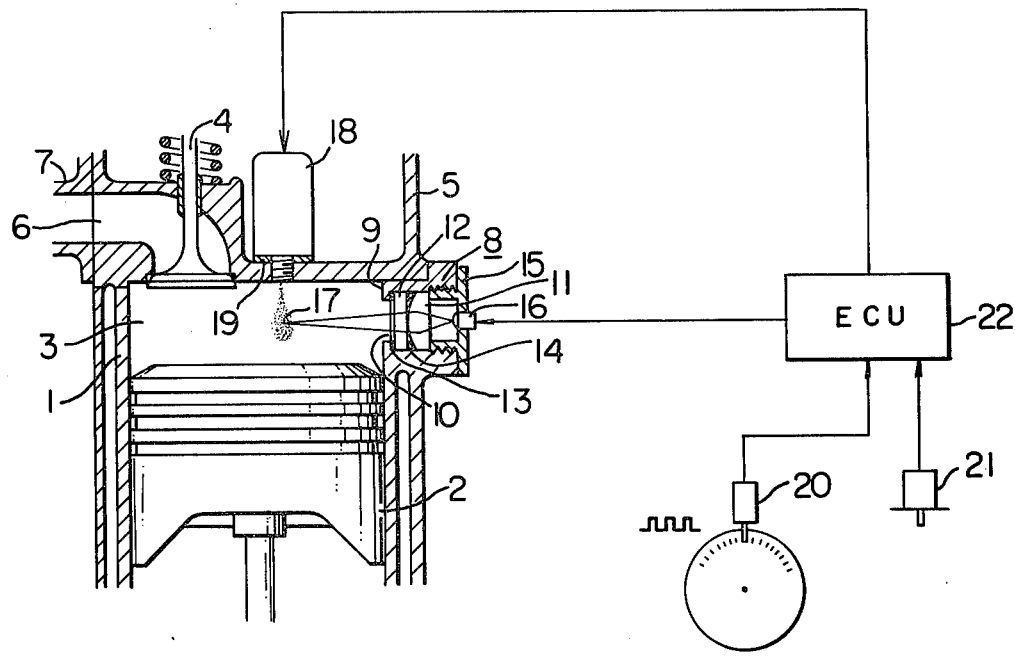
FIG. 1 shows, partly in section, the general structure of a first embodiment of the ignition apparatus according to the present invention.

Referring to FIG. 1, one of the cylinders 1 of a multi-cylinder internal combustion engine is shown in section. A piston 2 makes reciprocating movement in the engine cylinder 1 which includes a combustion chamber 3. An intake valve 4 is disposed in a portion of the cylinder head 5 forming the upper wall of the combustion chamber 3, and an intake path 6 is formed by an intake manifold 7 and the cylinder head 5. A light condensing unit 8 is disposed on the wall 9 of the combustion chamber 3. The light condensing unit 8 includes a condenser lens 11 of highly heat-resistive material and a heat-resistive glass sheet 12 protecting the condenser lens 11. The condenser lens 11 and the protective glass sheet 12 are snugly fitted together with a sealing member 13 of asbestos and a cushion ring 14 in a hole 10 bored in the wall 9 of the combustion chamber 3, and a threaded holding member 15 makes threaded engagement with the hole 10 to bring the elements 11, 12, 13 and 14 into pressure engagement. A light oscillator or light source 16 producing, for example, a laser beam of relatively low output level is coupled to the center of the holding member 15. The light condensing unit 8 is disposed at such an angular position that the light beam from the light source 16 can be condensed into a minimal spot 17 at the most easily ignitable position in the combustion chamber 3 taking into account the influence of various factors including the air-fuel ratio of the air-fuel mixture and the flow of the air-fuel mixture in the combustion chamber 3.

A particle supplying unit 18 of vibrating type using a piezoelectric element is provided for supplying minute particles of a material, which is not the fuel, toward the minimal spot of condensed light or focused point 17 where the energy density of light is highest. The minute particles used in the present invention are, for example, those of a solid such as pulverized coal which has a high factor of light energy absorption and is completely burnt during combustion of the air-fuel mixture, or those of a solid such as black anodized aluminum which is noncombustible. In consideration of the correlation of the factors including the delivery or ejection speed of the minute particles and the flow of the air-fuel mixture in the combustion chamber 3, the particle supplying unit 18 is coupled at its threaded portion to the cylinder head 5 with a sealing member 19 interposed therebetween and has its lower end opening into the combustion chamber 3 so as to supply the minute particles toward the minimal spot of condensed light or focused point 17.

An electrical control unit (ECU) 22 is electrically connected to the light source 16 and to the particle supplying unit 18 so that the light source 16 and the particle supplying unit 18 can be periodically driven at the most suitable ignition timing meeting the operating condition of the engine determined on the basis of the crank angle sensed by a crank angle sensor 20 coupled directly to the engine crankshaft (not shown) and the intake pressure sensed by an intake pressure sensor 21 communicating with the interior of the intake manifold 7, hence, the intake path 6. The particle supplying unit 18 may be driven continuously.

Figure 2:
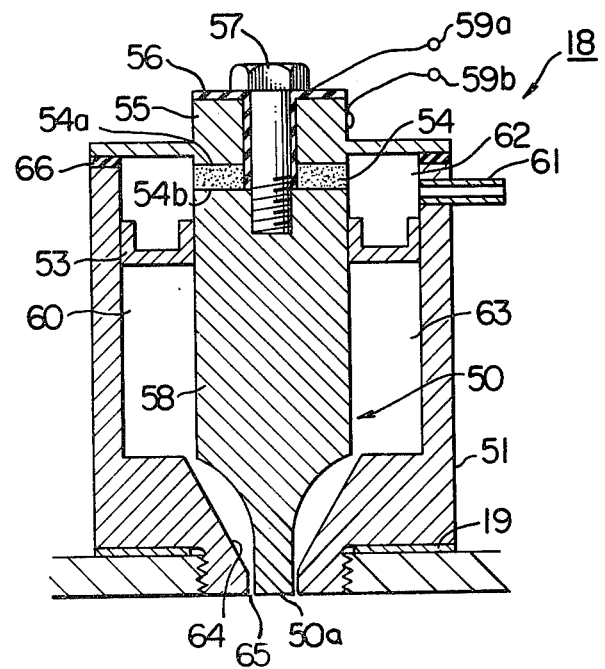
FIG. 2 is a sectional view showing in detail the structure of the particle supplying unit in FIG. 1.

FIG. 2 is a sectional view showing in detail the structure of the particle supplying unit 18. This particle supplying unit 18 includes, as its essential elements, a vibrating member 50 in the form of a solid cylindrical horn for imparting vibration to the minute particles, a housing 51 for holding the vibrating member 50 and storing the minute particles therein, and a pressure plate 53 for forcedly ejecting the minute particles. The vibrating member 50 includes a head portion 55, a horn portion 58 and a piezoelectric element 54 sandwiched between the portions 55 and 58. The piezoelectric element 54 vibrates in response to the driving power supplied from the ECU 22. A bolt 57 extends through the head portion 55 and the piezoelectric element 54 into the born portion 58 and is electrically insulated from the head portion 55 and piezoelectric element 54 by an electrical insulator 56. Thus, the piezoelectric element 54 is brought into pressure engagement with the lower end surface of the head portion 55 and the upper end surface of the born portion 58 by a predetermined force imparted by the bolt 57. A pair of leads 59a and 59b extend from the head portion 55 and bolt 57 making electrical engagement with the electrodes 54a and 54b of the piezoelectric element 54 respectively and are connected to the ECU w2. The space 60 defined between the vibrating member 50 and the housing 51 is divided into two chambers by the pressure plate 53 adapted for making axial sliding movement in the space 60 while making intimate engagement with the peripheral surface of the vibrating member 50 and the inner wall surface of the housing 51. That is, the space 60 is divided into an air chamber 62 and a storage chamber 63. Compressed air supplied from an air pump (not shown) is fed through a pipe 61, extending through the side wall of the housing.51, into the air chamber 62 to impart downward force to the pressure plate 53. The storage chamber 63 stores the minute particles under such a condition that the minute particles are pressurized always by the pressure plate 53 at a suitable pressure which will not be sufficient to eject the minute particles from an ejection port 65 (described later) due to the friction between the minute particles. The lower part of the storage chamber 63 includes a tapered wall 64 which acts to facilitate downward movement of the minute particles toward the ejection port 65 in the form of an annular gap which is defined by the concentric arrangement of the vibrating member 50 and the housing 51 and has a dimension slightly larger than the diameter of but smaller than the dimension which is two times the diameter of the minute particles. Therefore, only when the vibrating member 50 vibrates, the pressure imparted by the pressure plate 53 and the vibration of the vibrating member 50 coact to cause flowing movement of the minute particles thereby to eject the minute particles from the ejection port 65. The vibrating member 50 is supported at its head portion 55 on the upper end surface of the housing 51 with an electrical insulator ring 66 interposed therebetween, and means such as screws (not shown) are used to mechanically connect the vibrating member 50 to the housing 51 in air-tight relation.

The operation of the ignition apparatus having the above structure will now be described. In the so-called suction stroke in which the intake valve 4 fo the engine is urged to its open position in FIG. 1, the mixture of air and fuel supplied from the means such as the carburetor or the fuel injection value is drawn through the intake path 6 into the combustion chamber 3 and reaches the minimal spot of condensed light or focused point 17 until the suction stroke shifts to the compression stroke in which the intake value 4 is closed and the piston 2 moves upward. The ECU 22 supplies current to the particle supplying unit 18 continuously or at a suitable time corresponding to the ignition timing at which the minute particles are to be ejected to reach the minimal spot of condensed light or focused point 17. The piezoelectric element 54 shown in FIG. 2 vibrates, and, by the function of the horn portion 58 which amplifies the vibration and transmits the amplified vibration, the lower and 50a of the vibrating member 50 vibrates. This vibrating force coacts with the pressure of the pressure plate 53 urging the minute particles toward the ejection port 65 by being urged by the force of compressed air supplied into the air chamber 62, with the result that the minute particles are ejected from the ejection point 65 while vibrating to reach the minimal spot of condensed light or focused point 17 shown in FIG. 1.

On the other hand, the ECU 22 applies an electrical signal to the light source 16 at the most suitable ignition timing meeting the operating condition of the engine determined on the basis of the crank angle sensed by the crank angle sensor 20 and the intake pressure sensed by the intake pressure sensor 21. In response to the application of the electrical signal from the ECU 22, the light source 16 emits the light beam which is condensed by the condenser lens 11 to be directed toward the minute particles along the path of light which includes the minimal spot of condensed light or focused point 17. The substantial proportion of the energy of light is absorbed by the minute particles to heat the minute particles instantaneously up to a very high temperature, and, by the thermal energy of the heated particles, the air-fuel mixture is ignited to produce a flame which propagates through the air-fuel mixture to cause detonation followed by combustion.

FIG. 3 shows a second embodiment of the present invention, and, in FIG. 3, the same reference numerals are used to designate the same parts appearing in FIG. 1. This second embodiment is useful or effective when the air-fuel mixture flows so vigorously in the combustion chamber 3 that the minute particles ejected from the ejection port 65 may be blown away. Referring to FIG. 3, a sub-combustion chamber 101 is provided in the cylinder head 5 to communicate with the combustion chamber 3. The particle supplying unit 18 and the light condensing unit 8 are so disposed that the minute particles are supplied into the sub-combustion chamber 101, and the light beam from the light source 16 is directed through the light condensing unit 8 into the sub-combustion chamber 101, thereby causing ignition in the sub-combustion chamber 101.

When the light beam output from the light source 16 is large enough for igniting the air-fuel mixture, the minimal spot of condensed light or focused point need not necessarily be located at the existing position of the minute particles. FIG. 4 shows a third embodiment of the present invention which is useful or effective in such a case, that is, when the light beam emitted from the light source 16 is parallel rays. Referring to FIG. 4, the condenser lens 11 in the light condensing unit 8 shown in FIG. 1 is eliminated to leave the heat-resistive glass sheet 12 alone. In the structure shown in FIG. 4, the light source 16 is screwed into the hole 10 to bring the heat-resistive glass sheet 12, the sealing member or gasket 13 and the cushion ring 14 into pressure engagement in the hole 10.

FIG. 5 shows a fourth embodiment of the present invention. In FIG. 5, the focal distance of the condenser lens 11 is suitably selected to condense the light beam from the light source 16 into a spot capble of sufficiently igniting the air-fuel mixture by heating the minute particles.

In the aforementioned embodiments of the present invention, minute particles of a solid are employed to absorb the energy of light. However, such particles may be replaced by atomized droplets of a liquid such as the COM which is prepared by mixing tar, pitch and/or pulverized coal in heavy oil C. A fifth embodiment of the present invention employs such a liquid. As shown in FIG. 6, the particle supplying unit 18 shown in FIG. 1 is modified to be suitable for the injection of such a liquid and is provided in the form of an electromagnetic injection valve including an electromagnetic coil 201, a needle valve member 202 and a coil spring 203.

Figure 7:
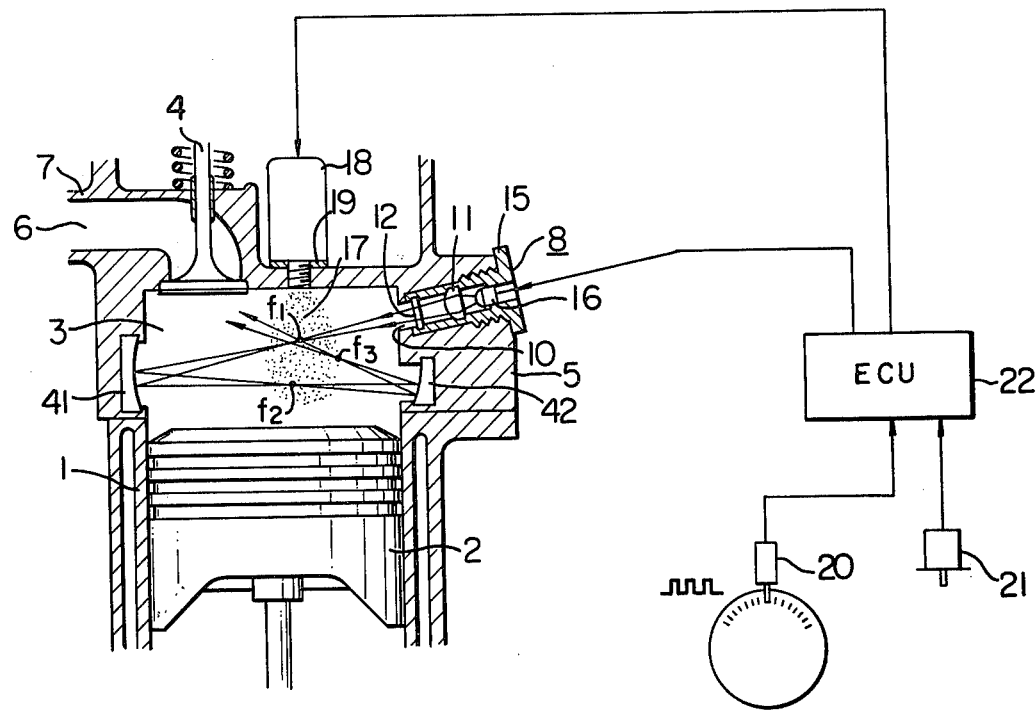
FIG. 7 shows, partly in section, the general structure of a sixth embodiment of the present invention.

FIG. 7 shows a sixth embodiment of the present invention which is a modification of the first embodiment shown in FIG. 1. In the sixth embodiment or modification, the light beam is focused to at least two or more points in the combustion chamber, and minute particles of a material different from fuel are supplied toward the plural focused points, so that a torch can be produced at each of these focused points in spite of a low energy density of light, and combustion can spread from a plurality of spots, thereby shortening the length of time required for complete combustion and improving the condition of combustion.

Describing the basic concept of the sixth embodiment, the energy received or absorbed by the minute particles is determined by the energy density of the light beam and the passing time of the minute particles through the light beam. Further, the rate of temperature rise of the minute particles differs depending on the size or diameter of the minute particles. The smaller the diameter of the minute particles, the smaller is the amount of energy required for attainment of the temperature level required for igniting the air-fuel mixture, but a longer time is required until a torch is produced around the minute particles. When the diameter of the minute particles is further smaller, the particles cannot provide the source of ignition and will disappear. When, on the other hand, the diameter of the minute particles is quite large, a very large amount of energy is required for heating the minute particles up to the high temperature.

In an internal combustion engine, for example, a diesel engine in which atomized liquid fuel is directly injected into the combustion chamber, it is preferable to form at least two or more focused points of the light beam in the stream of atomized fuel so as to shorten the length of time required for complete combustion and improve the condition of combustion.

For the sake of simplicity, the difference between the sixth embodiment and the first embodiment will only be described with reference to FIG. 7. Referring to FIG. 7, the light condensing unit 8 is mounted in the hole 10 bored in the cylinder head 5 and includes a condenser lens 11 of highly heat-resistive material, a heat-resistive glass sheet 12 protecting the condenser lens 11, a laser source 16 of relatively low output, and a holding member 15 fixedly holding the heat-resistive glass sheet 12, condenser lens 11 and laser source 16 in position. This light donensing unit 8 is so arranged that a focus $f_1$ is formed in the internal space of the combustion chamber 3. A reflector in the form of a concave mirror 41 is fixed to a portion of the inner wall of the cylinder head 5 to reflect the light beam focused to the point $f_1$ so that the reflected light beam can be focused to a second point $f_2$ in the combustion chamber 3. Another reflector 42 similar to the reflector 41 is fixed to another portion of the inner wall of the cylinder head 5 to reflect the light beam focused to the second point $f_2$ so that the reflected light beam can be focused on a third point $f_3$ in the combustion chamber 3. The radii of curvature and locations of the reflectors 41 and 42 are determined so that at least two or more focused points exist in the combustion chamber 3.

A particle supplying unit 18 of vibrating type using a piezolectric element is provided for supplying minute particles of a material, which is not the fuel, toward the focused points $f_1$, $f_2$, $f_3$, . . . of the light beam. The minute particles used in the present invention are, for example, those of a solid such as pulverized coal which has a high light-energy absorption factor and is completely burnt during combustion of the air-fuel mixture, or those of a solid such as black anordized alminum which is noncombustible. In consideration of the correlation of the factors including the delivery or ejection speed of the minute particles and the flow of the air-fuel mixture in the combustion chamber 3, the particle supplying unit 18 is coupled at its threaded portion to the cylinder head 5 with a sealing member 19 interposed therebetween to open at its lower end into the combustion chamber 3 so as to supply the minute particles toward the focused points $f_1$, $f_2$, $f_3$, . . . of the light beam.

The operation of the sixth embodiment of the ignition apparatus having the above structure will now be described. In the so-called suction stroke in which the intake valve 4 of the engine is urged to its open position in FIG. 7, the mixture of air and fuel supplied from the means such as the carburetor or the fuel injection valve is drawn through the intake path 6 into the combustion chamber 3, and the air-fuel mixture is filled in the combustion chamber 3 until the suction stroke shifts to the compression stroke in which the intake valve 4 is closed and the piston 2 makes upward movement. The ECU 22 supplies current to the particle supplying unit 18 continuously or at a suitable time corresponding to the ignition timing at which the minute particles are to be ejected to reach the focused points $f_1$, $f_2$, $f_3$, . . . of the light beam. The piezoelectric element 54 shown in FIG. 2 vibrates, and, by the function of the horn portion 58 which amplifies the vibration and transmits the amplified vibration, the lower end 50a of the vibrating member 50 vibrates. This vibrating force coacts with the pressure of the pressure plate 53 urging the minute particles toward the ejection port 65 by being urged by the force of compressed air supplied into the air chamber 62, with the result that the minute particles are ejected from the ejection port 65 while vibrating to reach the focused points $f_1$, $f_2$, $f_3$, . . . of the light beam in FIG. 7.

On the other hand, the ECU 22 applies an electrical signal to the light source 16 at the most suitable ignition timing meeting the operating condition of the engine determined on the basis of the crank angle sensed by the crank angle sensor 20 and the intake pressure sensed by the intake pressure sensor 21. In response to the application of the electrical signal from the ECU 22, the light source 16 emits the light beam which is focused to the points $f_1$, $f_2$, $f_3$, . . . by the condenser lens 11 and reflectors 41, 42. The minute particles passing these focused points absorb the energy of light and are heated up to a very high temperature, and, by the thermal energy of the heated particles, the air-fuel mixture is ignited to produce torches at these points. Since the minute particles are moving in the combustion chamber 3, the larger the number of the focused points, the higher is the probability of the minute particles passing the focused points, so that the air-fuel mixture can be more reliably ignited. Since the torches are produced at the individual focused points, flames propagate from these areas to cause detonation followed by combustion.

Figure 8A:
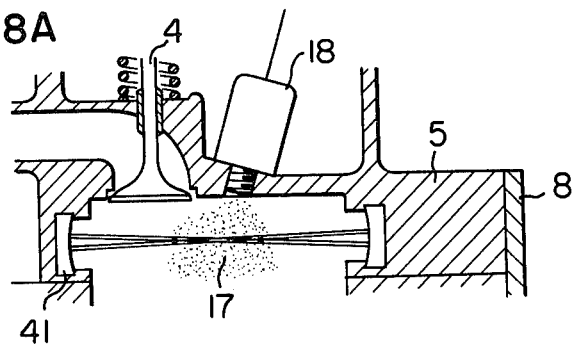
Figure 8B:
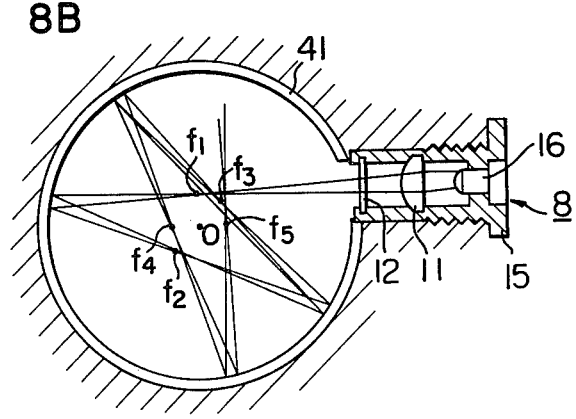

FIGS. 8A and 8B show a seventh embodiment of the present invention which is a modification of the sixth embodiment, FIG. 8A being a vertical sectional view of the combustion chamber 3 and FIG. 8B being a cross sectional view of FIG. 8A. In this seventh embodiment, the two reflectors are integrally combined to provide a single reflector 41 which is part of a hollow sphere, so as to increase the number of focused points in the combustion chamber 3. Referring to FIGS. 8A and 8B, the light beam emitted from the light source 16 and condensed by the light condensing unit 8 is focused to a point $f_1$ which is displaced from the center 0 of the hollow sphere and is then reflected by the part-spherical reflector 41 to be focused to a plurality of other points $f_2$, $f_3$, $f_3$, $f_4$, $f_5$, . . . dispersed around the center 0 of the hollow sphere as seen in FIG. 8B.

Figure 9:
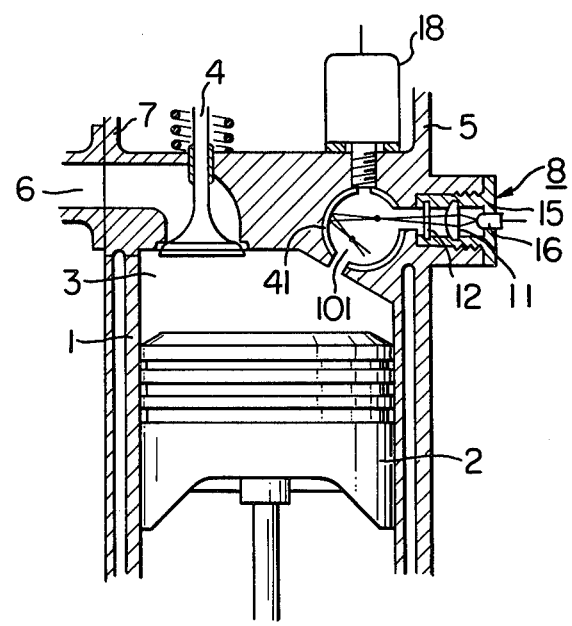
FIG. 9 is a sectional view showing the structure of part of an eighth embodiment of the present invention.

FIG. 9 shows an eighth embodiment of the present invention which is generally similar to the second embodiment shown in FIG. 3. This eighth embodiment is similarly useful or effective when the air-fuel mixture flows so vigorously in the combustion chamber 3 that the ejected minute particles may be blown away. Referring to FIG. 9, a sub-combustion chamber 101 is provided in the cylinder head 5 to communicate with the combustion chamber 3. The particle supplying unit 18, the light condensing unit 8 and a part-spherical reflector 41 are so disposed that the minute particles are supplied into the sub-combustion chamber 101, and the light beam from the light source 16 is condensed by the light condensing unit 8 and reflected by the reflector 41 to form a plurality of focused points in the sub-combustion chamber 101, thereby causing ignition in the sub-combustion chamber 101.

Although minute particles of a solid are employed to absorb the energy of light, such particles may be replaced by atomized droplets of a liquid such as the COM which is prepared by mixing tar, pitch and/or pulverized coal in heavy oil C. In this embodiment, the electromagnetic injection valve shown in FIG. 6 is preferably used in lieu of the particle supplying unit 18, as it is suitable for liquid injection.

Figure 10:
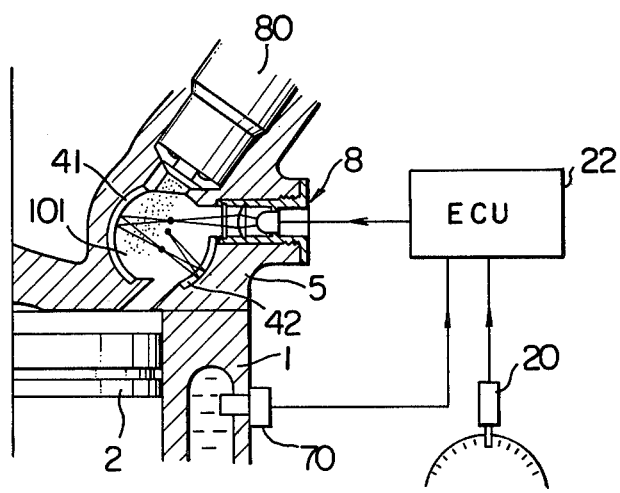
FIG. 10 shows, partly in section, the structure of part of a ninth embodiment of the present invention.

FIG. 10 shows a ninth embodiment of the present invention, and, in FIG. 10, the same reference numerals are used to designate the same parts appearing in FIG. 7. In a diesel engine, atomized fuel is directly heated. In the diesel engine, the atomized fuel is generally heated and ignited by a pre-heating plug in the starting stage. However, a considerable length of time is required until the temperature of the plug rises up to the required level, and this means that the engine cannot be started with high efficiency. In order to obviate such a drawback, the ninth embodiment employs a temperature sensor 70 sensing the temperature of the engine and applying its output signal to the ECU 22. On the basis of the sensor output signal, the ECU 22 judges whether the engine temperature is high or low. When the result of judgment proves that the engine temperature is low, the laser beam is directly directed toward the atomized fuel to strike the fuel at the predetermined crank angle so as to ignite the atomized fuel in the vicinity of a plurality of focused points of the laser beam. FIG. 10 is a sectional view of aprt of this embodiment when applied to a diesel engine of vortex chamber type. The light condensing unit 8 and the reflectors 41, 42 cooperate to form a plurality of focused points of the laser beam in the sub-combustion chamber 101, and a fuel injection valve 80 injects atomized fuel toward the plural focused points in the sub-combustion chamber 101.

We claim:

1. An ignition apparatus for an internal combustion engine having a combustion chamber, comprising:
    means for supplying a mixture of air and fuel into said combustion chamber,
    means having an end thereof opening into said combustion chamber for supplying minute particles of a material which is not the fuel and has a high light absorption factor, and
    means for radiating a light beam toward a suitably selected position in the internal space of said combustion chamber so that the light beam can strike said minute particles of high light absorption factor supplied from said particle supplying means.

2. An ignition apparatus as claimed in claim 1, wherein said light beam radiating means includes means for converging said light beam so that said light beam can be directed at least toward the existing position of said minute particles.

3. An ignition apparatus as claimed in claim 2, wherein said light beam radiating means includes means for condensing said light beam into a minimal spot at the existing position of said minute particles.

4. An ignition apparatus as claimed in claim 1, wherein said particle supplying means supplies minute particles having the property of burning with the combustion of the air-fuel mixture in said combustion chamber.

5. An ignition apparatus as claimed in claim 1, wherein said particle supplying means supplies minute particles of a solid.

6. An igntion apparatus as claimed in claim 1, wherein said particle supplying means supplies atomized droplets of a liquid.

7. An ignition apparatus as claimed in claim 1, wherein said particle supplying means inlcudes a vibrating member imparted with vibrating force from a piezoelectric element, a housing enclosing said vibrating member, a particle ejection port in the form of an annular gap defined by concentric arrangement of said housing and said vibrating member, and a pressure plate urged by the force of compressed air to urge said minute particles toward said ejection port, the dimension of said annular gap forming said ejection port being selected to be smaller than the dimension which is two times the diameter of said minute particles.

8. An ignition apparatus as claimed in claim 1, wherein said particle supplying means is an injection valve including a needle valve member urged to its open position by an electromagnetic coil.

9. An ignition apparatus as claimed in claim 1, wherein said light beam from said light beam directing means strikes said minute particles in the vicinity of the central area of said combustion chamber.

10. An ignition apparatus as claimed in claim 1, wherein said combustion chamber of the engine communicates with a sub-combustion chamber.

11. An ignition apparatus as claimed in claim 1, further comprising reflector means for focusing said light beam to at least two or more points in the internal space of said combustion chamber, said particle supplying means supplying said minute particles of high light absorption factor toward said focused points of said light beam.

12. An ignition apparatus as claimed in claim 11, further comprising a sub-combustion chamber communicating with said combustion chamber, said reflector means being in the form of a concave mirror disposed in said sub-combustion chamber so as to form said focused points of said light beam in said sub-combustion chamber, and said particle supplying means being disposed so as to supply said minute particles into said sub-combustion chamber.

13. An ignition apparatus as claimed in claim 12, wherein said sub-combustion chamber communicating with said combustion chamber is in the form of a hollow sphere provided with a hole for mounting said particle supplying means and an inlet opening for said light beam, and the first focused point of said light beam is formed in an area displaced from the center of said hollow spherical sub-combustion chamber.

* * * * *